March 15, 1966 R. H. CARTER ETAL 3,240,915
INFRA-RED HEATER
Filed Sept. 19, 1962 8 Sheets-Sheet 2

INVENTORS:
R.H. CARTER,
R.W. JEFFERY,
C.A. WILLIAMS.
BY Hugh A Kirk
ATT'Y.

INVENTORS:
R. H. CARTER,
R. W. JEFFERY,
C. A. WILLIAMS.
BY Hugh A. Kirk
ATT'Y.

March 15, 1966  R. H. CARTER ETAL  3,240,915
INFRA-RED HEATER

Filed Sept. 19, 1962  8 Sheets-Sheet 4

INVENTORS:
R. H. CARTER,
R. W. JEFFERY,
C. A. WILLIAMS.
BY
Hugh A Kirk
ATT'Y.

March 15, 1966 R. H. CARTER ETAL 3,240,915
INFRA-RED HEATER
Filed Sept. 19, 1962 8 Sheets-Sheet 5

INVENTORS:
R. H. CARTER,
R. W. JEFFERY,
C. A. WILLIAMS.
BY
Hugh A Kirk
ATT'Y.

March 15, 1966  R. H. CARTER ETAL  3,240,915
INFRA-RED HEATER
Filed Sept. 19, 1962  8 Sheets-Sheet 6

INVENTORS:
R. H. CARTER,
R. W. JEFFERY,
C. A. WILLIAMS.
BY
ATT'Y.

March 15, 1966   R. H. CARTER ETAL   3,240,915
INFRA-RED HEATER
Filed Sept. 19, 1962   8 Sheets-Sheet 7

INVENTORS:
R.H. CARTER,
R.W. JEFFERY,
C.A. WILLIAMS.
BY Hugh A Kirk
ATT'Y.

FIG-26-

United States Patent Office 3,240,915
Patented Mar. 15, 1966

3,240,915
INFRA-RED HEATER
Richard H. Carter, Robert W. Jeffery, and Charles A. Williams, Fostoria, Ohio, assignors to Fostoria Corporation, Fostoria, Ohio, a corporation of Ohio
Filed Sept. 19, 1962, Ser. No. 225,414
40 Claims. (Cl. 219—343)

This invention relates to new and improved type of infra-red heater units. More particularly, it deals with fluid cooled linear type infra-red sources and reflectors backed by a heat conductive material or materials which act as a heat sink for all the energy which is not reflected by the reflectors, whereby objects can be heated by the source up to 3000° F. without damage to the source. These units are adapted to be assembled into banks and/or groups or around the inside of an enclosure to form a furnace or portion thereof.

Previously the temperature to which objects could be heated by infra-red was limited by the heat which the source of the infra-red, its envelope and reflector could withstand without suffering deterioration, namely oxidation, softening, burning, sagging, devitrification, migration of the reflector surface, and/or melting. Therefore, in the case of an electrically heated infra-red source, only equipment producing product temperatures much lower than 3000° could be used continuously because of the deterioration of the glass or envelope around the electrical heating element of the source.

Accordingly it is an object of the present invention to produce a new, efficient, effective, economic, and simple electric infra-red heating unit which may be used continuously for heating objects quickly to high temperatures, or short cycle times in a high radiant environment.

Another object is to produce an infra-red heater which quickly heats objects to a very high temperature without the retention of heat by the component assembly and with little heating of the atmosphere between the heat source and the object, and which also just as quickly cuts off the heat so as to be readily adapted for short cycle heating processes where high heats are required with the minimum storage of heat. It is thereby comparable to an induction heating unit, except it has the advantage of being able to heat nearly any type of material while induction heating is limited to certain types of material.

Another object is to produce such an infra-red heater unit which may be readily connected in multiple to produce an oven or furnace of any desired size and contour.

Another object of the heater of this invention is that it can be used to approach an ideal radiant oven, that is a sphere which is 100% reflective, so that all energy emitted from the source is radiated to the object to be heated. This is accomplished by surrounding the object to be heated with the heating units of this invention having a high percent of reflection of the infra-red rays that are not directly emitted toward the object to be heated, and by employing a source which has a high infra-red output.

Another object is to produce such a heating unit which may be employed to heat objects up to a temperature of 3000° F. continuously in a clean, safe, highly reliable manner, which unit is compact, has low maintenance, is greatly flexible and may be produced in modular parts, and may be easily disassembled so that the heating source or element itself may be readily removed and replaced.

Another object is to produce such a heater which eliminates contamination of the products being heated during high temperature processing, which is readily adaptable for use in special atmospheres, which is very easily and precisely controlled, because it is controlled by electric energy, and may be used in any position or type of furnaces, horizontal, vertical, or at an angle, or cylindrical furnaces, and for all sizes of products ranging, for example, from tiny objects as transistors to railroad cars.

Another object is to produce such a heater which has a low initial cost, does not employ explosive fuels, is clean, and is able to obtain very high efficiencies, that is, the heat put into the product relative to the energy put into the heater.

As a result of the advantages of the infra-red heaters of this invention, they may be employed practically for baking on porcelain enamels, pre-heating strips for steel mills, heating forge billets, hot shearing, hot forming, annealing, stress relief, brazing, high speed finishing, the drying of inks on printing presses, the drying of textiles, degreasing, the polymerization of plastics, high temperature testing, the heating of foods, adhesives, electronics, semi-conductor crystal growth, simulating nose cone re-entry heats for the testing of missiles, and the like.

Generally speaking, the heating unit of this invention comprises a linear or tubular type infra-red source which may be of metal, silicon carbide, tungsten, nickel-chromium alloy, or other electrical heating element which may have an opaque, transparent, or translucent envelope including glass and quartz, and/or which heating element or source may be employed in a normal or inert atmosphere at an elevated or reduced pressure including even a vacuum. These tubes are located along the focal lines of parallel reflectors which may have flat, ribbed, spherical, parabolical, elliptical or other contoured reflecting surfaces, preferably of high infra-red reflectivity, such as gold or processed aluminum to resist corrosion and oxidation. These surfaces are formed in an extruded high heat conductive material, for example such as copper or aluminum, of considerable mass which may be formed to correspond to the dimensions of the heating elements or tubes. In the opposite sides of these extrusions from their reflectors, there are provided fins, grooves and/or channels along and in which tubes or ducts may be mounted or formed in intimate heat conducting relationship with the mass of these extrusions. Along, by, or through these fins, grooves and/or tubes cooling fluids are conducted to remove heat so that these extrusions act as heat sinks. The cooling fluid usually used is water, although other liquids including refrigerants also may be used. Gases, including air, also may be used to remove heat from the fins and grooves on these heat conductive masses or sinks. Thus, the heating elements associated with these heat sinks may be maintained as cool as needed to protect the heat source itself, to keep the stored heat in the equipment to a desired level, and to protect the reflecting surfaces. Thus high product temperatures can be obtained, in that the energy from the elements can be substantially all radiated and reflected toward the object to be heated. Each extrusion, reflector and heat conductive mass, or heat sink unit may also be provided with flanges for the purpose of mounting and/or connecting units adjacent to each other, or along a bar, or in banks as a furnace.

The units of this invention may be mounted in flat banks or on opposite sides of the rectangular furnace, or in polygonal, cylindrical, spherical, or other form to surround or partly surround the object or objects to be heated.

Particularly, when a plurality of units are mounted adjacent each other to form a furnace, it is important also to maintain the terminals of the heat sources at opposite ends of the tubes as cool as possible for which additional precautions may be employed including air cooling and heat sink baffles between the ends of the heating elements or tubes and the terminal block. These banks or groups of units may be mounted and controlled so that alternate or different combinations of the units may be connected to different circuits for producing different heats at different locations on the object or objects being heated inside the furnace. If a special furnace atmosphere or additional cooling is required, the units may be spaced or apertures drilled in the sinks through which spaces or apertures a cooling fluid such as air or inert gas may be forced by a fan or other pressurization methods, either for cooling the heating elements themselves and/or removing gases from the furnace or maintaining a pressure inside the furnace. Across the edges of the reflectors on the heat sinks there also may be mounted quartz windows for directing the cooling gases from the apertures in the sinks along the heating elements, or the elements may be mounted in tubular sheaths and cooling gases passed therethrough round the elements.

The above mentioned and other features and objects of this invention and the manner of attaining them will become more apparent and the invention itself will be understood best by reference to the following description of several embodiments of the invention taken in conjunction with the accompanying drawings, wherein.

In describing the above figures in detail, the following outline will be used:

I HEATING UNITS
   A Infra-red Sources
   B Heat Sinks
      1. Single source cylindrical reflector (FIGS. 1 and 2).
      2. Single source parabolic reflector (FIGS. 3–10).
      3. Multi-source cylindrical reflectors (FIG. 11).
      4. Single source elliptical reflector (FIG. 12).

Figure 18:
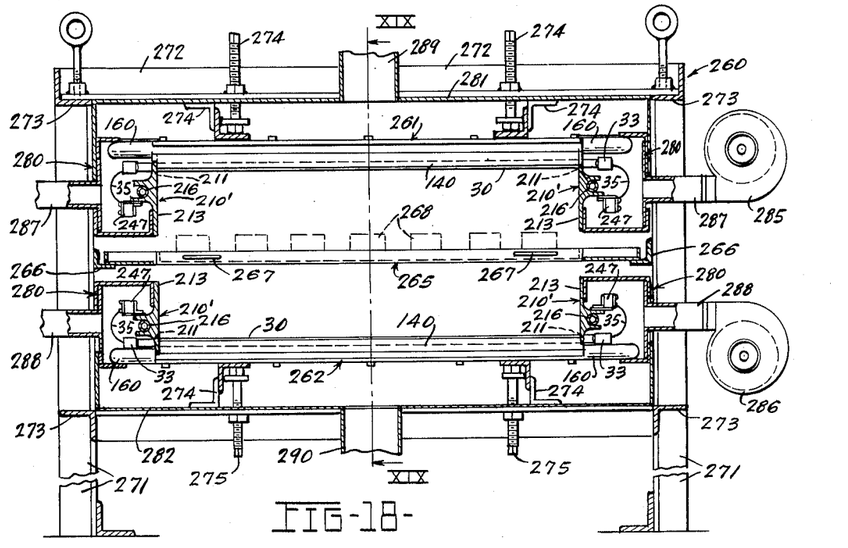
FIG. 18 is a vertical sectional view of a rectangular furnace having an upper and a lower bank of infra-red heat sources made up of units of the type shown in FIG. 11, together with an intermediate tray or conveyor for supporting the objects which are to be heated by this furnace, and means for blowing air over and around the outer sides and terminal ends of the heating units in each bank.
Figure 19:
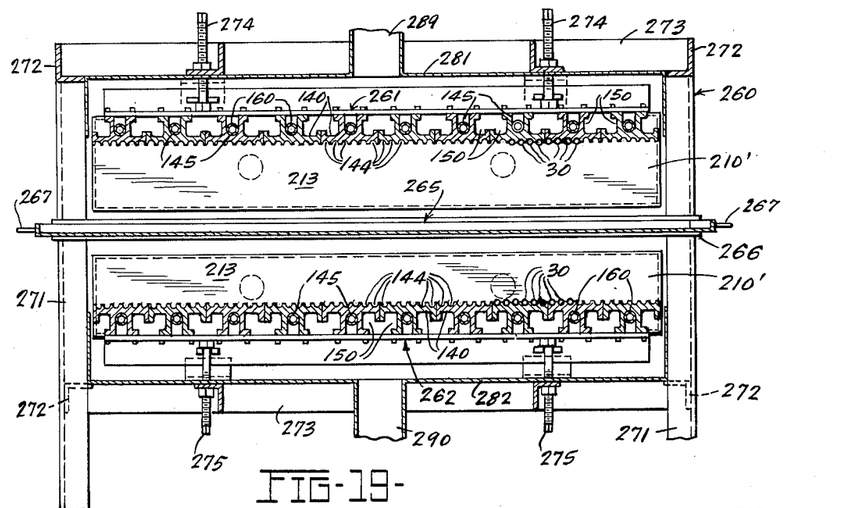
FIG. 19 is a vertical section taken along XIX—XIX of the furnace of FIG. 18.
Figures 20, 21, 22:
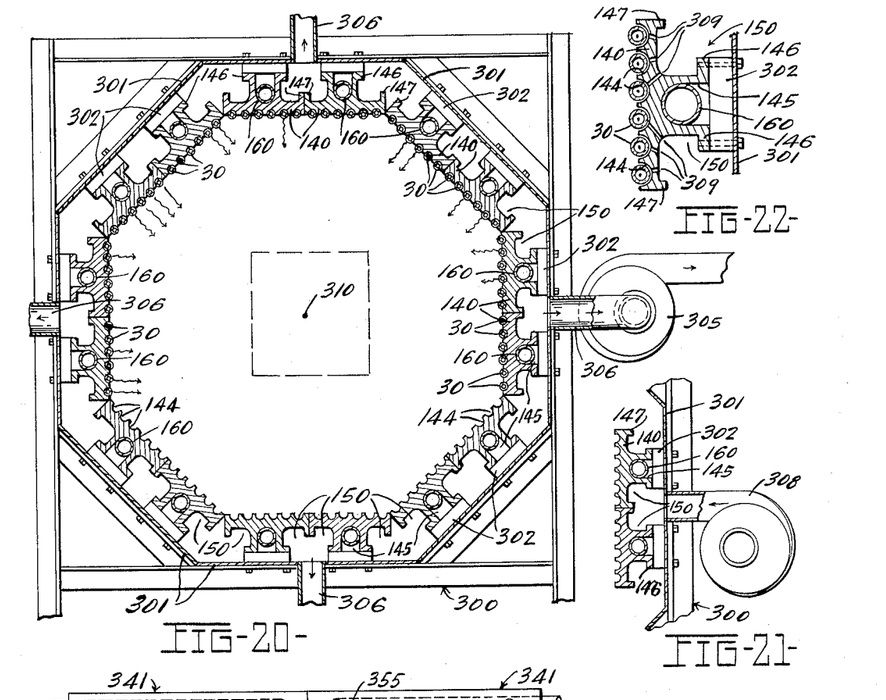
FIG. 20 is a cross-sectional view of an octagonal furnace in which each side is made up of a pair of the units of FIG. 11, showing means for sucking fresh air in from the terminal ends of the units and out through the center of the furnace for further cooling of the heating units.
FIG. 21 is a partial sectional view of the fan for forcing air over the units instead of sucking the air as shown in FIG. 20.
FIG. 22 is an enlarged cross-sectional view of a modified type of the unit shown in FIG. 11, in which apertures are provided behind each of the heating elements from the reflectors through the heat sink mass, through which apertures air may be blown for cooling the heating elements as well as changing or pressurizing the atmosphere inside a furnace.
Figure 23:
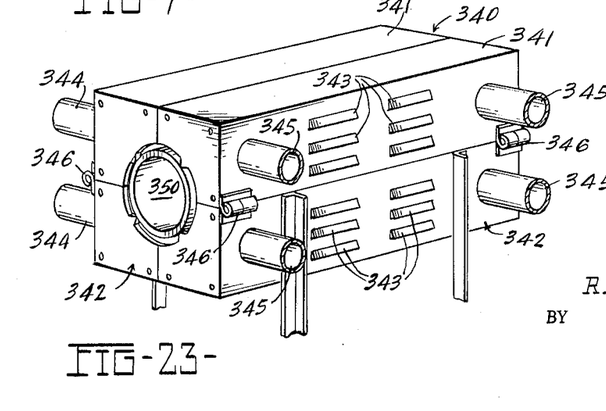
FIG. 23 is a perspective view of a cylindrical furnace which may be divided in four parts, showing air ducts for cooling the backs of the units, and the end of a quartz cylinder which separates the heating elements from the objects to be heated which is placed in the center of this quartz cylinder.
Figure 24:
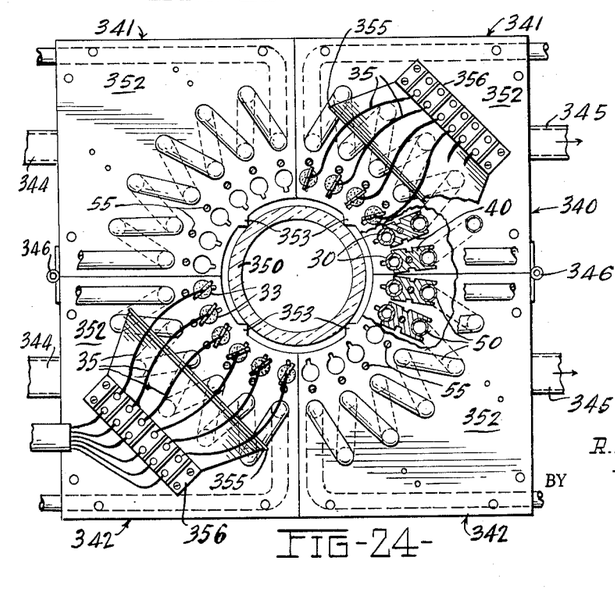
FIG. 24 is an enlarged end view with parts broken away of a furnace similar to that shown in FIG. 23, having equal hinged quadrants and heating units of the type shown in FIGS. 1 and 2, which units are slightly spaced so the air may be circulated between them and along the outside of the central quartz tube for cooling purposes.
Figure 25:
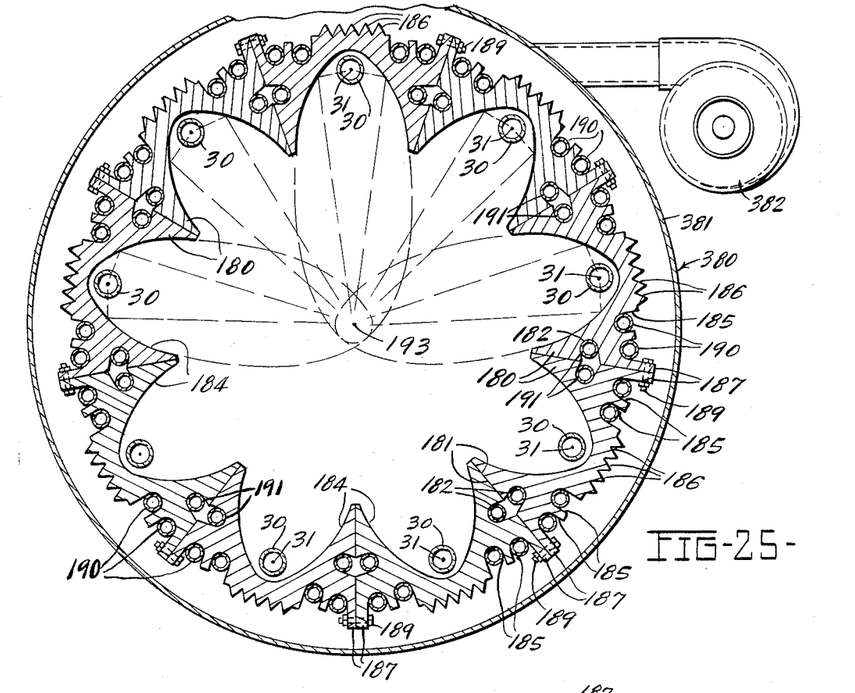
FIG. 25 is a cross-sectional view of still another type cylindrical furnace employing a plurality of the extrusions of the type shown in FIG. 12, in which all of the other foci of the elliptical reflectors coincide with the center axis of the furnace where the object to be heated is placed.
Figure 26:
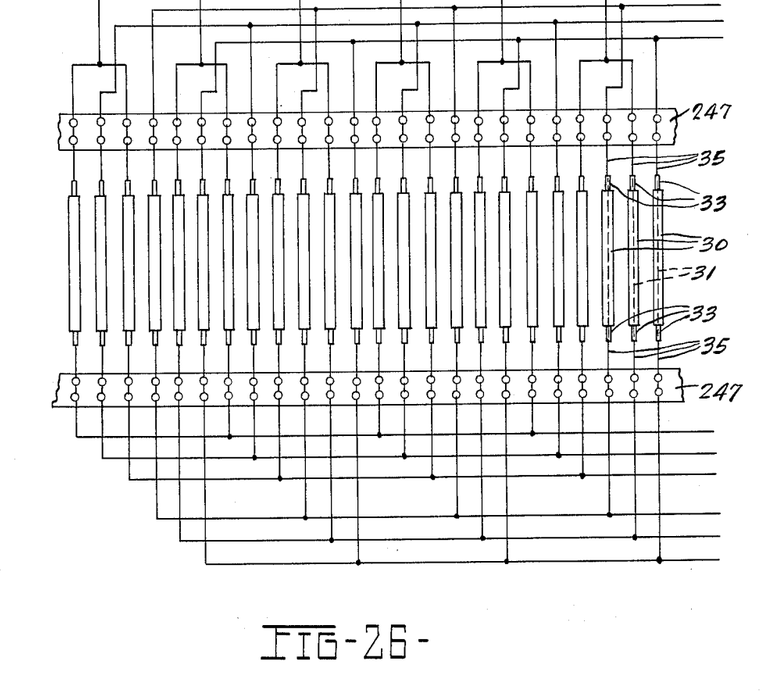
FIG. 26 is a schematic wiring diagram of how different combinations of the tubular infra-red sources shown in any of the previously described furnaces may be connected for heating, and/or changing the temperature by changing the voltage in any group of alternate one, two or three of the units for accurate and precision control of the temperature of the objects which are being heated in a furnace according to this invention.

II FURNACES
   A Flat Furnace (FIGS. 13 through 17).
   B Rectangular Furnace (FIGS. 18 and 19).
   C Polygonal Furnace (FIGS. 20 through 22).
   D Cylindrical Furnaces (FIGS. 23, 24 and 25).
   E Furnace Controls (FIG. 26).

I HEATING UNITS

A Infra-red sources

Figure 1:
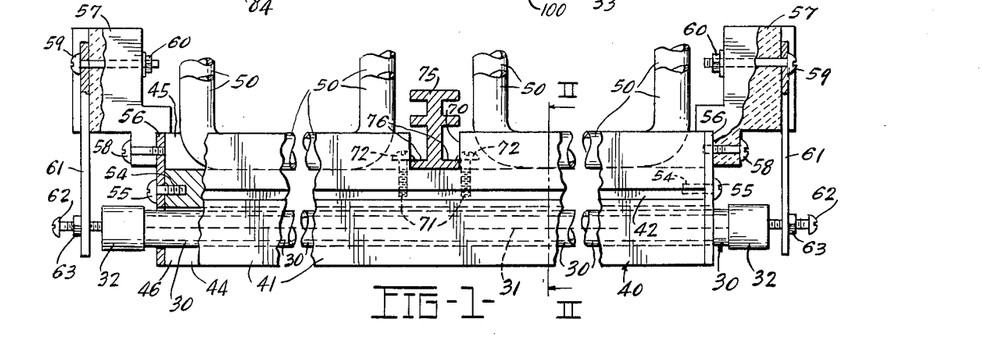
FIG. 1 is a side elevation in partial vertical section of one infra-red tube unit with one fluid cooling duct showing a button type terminal on the end of the tubular infra-red source and means for supporting the center of the unit along a transverse beam.
Figure 3:
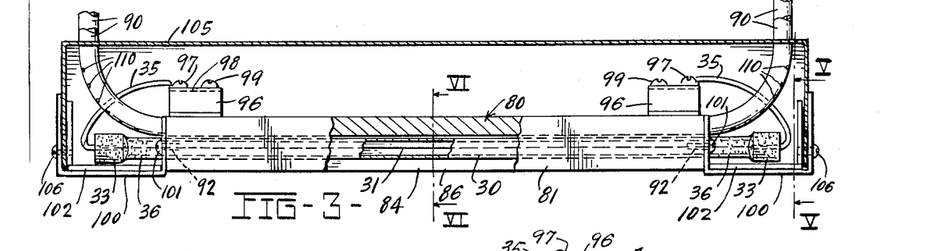
FIG. 3 is a side elevation partly in section of another embodiment of a unit having a single infra-red tubular source and a pair of cooling ducts with pig-tail type of terminals at the ends of the infra-red tubular sources.
Figure 4:
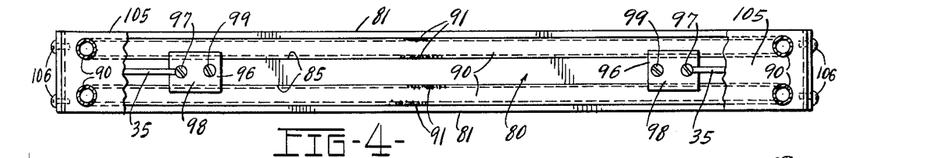
FIG. 4 is a top plan elevation of the unit shown in FIG. 3 showing the two cooling ducts.
Figure 8:
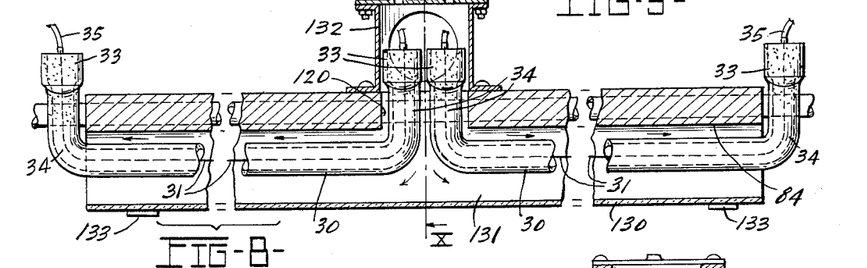
FIG. 8 is a longitudinal vertical section of a pair of units employing a heat sink extrusion similar to that shown in FIGS. 3 through 7 employing a flat U-shaped tubular heat source in which the terminal ends are bent at right angles to the elongated heat source part of the tube, and showing an aperture between the ends of the heat sink for adjacent terminal ends of the heat source through which aperture a cooling fluid such as air may be forced to cool the terminal ends and also the elongated heat source by retaining the cooling fluid within the reflector channel of the heat sink by a quartz or transparent glass plate across the open side of the reflector.

In FIGS. 1, 3 and 8 there are shown three types of tubular infra-red sources each of which comprises a transparent or translucent tubular envelope 30 in the center of which is located an electrically heated infra-red ray emitting filament 31. Metallic rod type heating elements or sources also may be employed in place of the tubular sources or elements shown. These envelopes may be composed of glass but preferably of quartz or high heat resisting material which may be either transparent or translucent, and are shown either to be absolutely tubular as shown in FIG. 1 with metal cap terminals 32 at their ends, or may be pinched together at their ends as shown at 33 in FIGS. 3, 5, 11, 14, 17 and 24; or the ends may be bent at right angles to the tubular section 30 as shown by the portions 34 in FIGS. 8, 9 and 10, the ends of which may be provided with any suitable type of terminals. From the pinched ends 33, pig-tail terminals 35 of electrically conducting wire extend. The ends of the tubes 30 adjacent their terminals, may be gold plated as shown at 36 in FIG. 3 to reduce the amount of heat adjacent the terminals.

The filaments 31, which comprise the infra-red radiation source per se, preferably are of tungsten which will give off 86% radiant energy from a translucent envelope and 91 to 92% from a clear quartz envelope at 4100° F. in an oxygen free envelope, such as of quartz. However, a nickel chromium alloy wire such as Nichrome may be used up to 1900° F. to give 56% radiant energy, and may also be used at lower temperatures where less penetration of the rays through the object to be heated is desired, such as for skin heating, drying jobs, and the like. In this case a transparent or translucent envelope is not necessarily required in that a lower temperature metallic envelope may also be used. Since the radiation is proportional to the fourth power of the temperature of the source, it is important to employ a source which has as high a radiant efficiency of infra-red as possible in order to obtain as high a heat as possible from the unit. Thus different type tubular sources for infra-red radiant energy may be employed depending upon the type of job for which the heater is to be used. However, for the highest produced temperature, that is up to 3000° F., a tungsten filament and quartz envelope for the tube 30 is preferred.

I–B Heat sinks

Since the amount of heat that can be used from an infra-red ray source depends upon the heat that the source element and its envelope can stand, which for a quartz tube is about 1750° F. before the envelope devitrifies or softens, this invention provides a closely located reflector of high infra-red reflectivity and high heat conductive mass through and/or along which mass cooling fluid ducts are located so that all energy which is not radiated or reflected by the reflector is quickly conveyed away so as this mass acts as a heat sink to maintain both the reflector and the adjacent envelope of the heat source as cool as possible. There are several forms of high heat conductive masses or heat sinks disclosed, although this invention should not be limited to their specific configurations.

Figure 2:
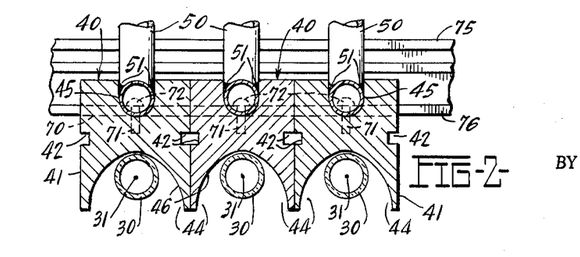
FIG. 2 is a vertical section taken along line II—II of FIG. 1 showing cross-section of the extruded metal heat sink part of the unit between the cylindrical reflector of the heat sink and the groove for the cooling fluid duct, and how a plurality of such units may be mounted adjacent each other along a supporting bar means.

I–B–1 Single source cylindrical reflector (FIGS. 1 and 2)

Of the four basic forms or types of extrusions shown as heat sinks for tubular infra-red heat source elements, the first is disclosed in FIGS. 1 and 2 with parts thereof later shown also in FIGS. 7 and 24. This heat sink comprises a solid copper or aluminum extrusion 40 cut to a length preferably short of the length of the tube source 30, so as to expose the terminal ends thereof for easy electrical connection purposes. This extrusion 40 may be provided with parallel opposite sides 41 that may have grooves 42 therein for aligning a plurality of units together as shown in FIG. 2. The opposite edges of these extrusions 40 contain grooves 44 and 45 into which the infra-red source tube 30 and a fluid conducting duct 50 are, respectively, substantially completely embedded. In the first case, the source in groove 44 is thereby isolated from adjacent sources as shown in FIG. 2 so that radiation therefrom will not overheat the envelopes 30 of adjacent heat sources; and in the latter case, the groove 45 is sufficiently deep so that very intimate contact may be had with the cooling fluid duct 50 and as much heat as possible can be conducted away from the extrusion, block, mass or heat sink.

The reflective surface 46 of the groove 44 is preferably coated with a thin layer of gold, in that gold reflects 97% to 98% of infra-red radiation as well as resists corrosion, even when used in very thin layers. The gold plating will withstand heat up to 500° F. on metal, and will withstand heat on enamel on the metal up to 1200° F. Thus the reflector surfaces may be first coated with enamel and then coated with gold. However, processed aluminum reflecting surfaces may be used which have a reflection of about 85% of infra-red radiation; the processing being to make the reflective surface 46 resistant to oxidation, and may be a silica-aluminum sandwich.

The fluid ducts 50 are preferably made of high heat conducting material, such as copper tubing, and preferably are soldered or brazed in the grooves 45, such as by means of solder 51 or other heat conducting bonding material.

The ends of the extruded strips 40 may be provided with a tapped hole 54 into which may be threaded a screw 55 for holding an end plate 56 which may extend transversely of the ends of a plurality of said extrusions 40 as a means of mounting the same in a frame. Also attached to this plate 56 may be an electrically insulated block 57 by means of a screw 58 which block 57 may carry a terminal bolt 59 and nut 60 for holding a leaf spring 61, at the outer end of which is provided with adjustable lock bolt 62 which threads through a nut 63 welded or otherwise attached to the outer end of the spring 61 for adjusting the tension against the metal terminal cap 32 at the adjacent end of the infra-red tubular source 30. The inner end of the bolt 59 to which the nut 60 is attached may be employed for attaching the electrical wires or conductors which feed the current to the opposite ends of the electrical infra-red source 30.

Intermediate the ends of the long extruded strip 40 there may be provided a notch 70 transverse of the groove 45, and a pair of tapped holes 71 adjacent opposite sides of the notch 70 may seat headed screws 72 for anchoring a transverse supporting girder, bar, or member 75 having lower flanges 76 which fit underneath the heads of the screws 72. This bar 75 aids in preventing sagging of the extruded heat sinks 40 or may even support their whole weight.

I–B–2 *Single source parabolic reflector (FIGS. 3–10)*

Referring now to another embodiment or type of heating unit shown in FIGS. 3 through 6, a pig-tail terminated 35 tubular infra-red source envelope 30 is mounted in another type extrusion 80 of greater width between its parallel sides 81 than the heat sink extrusion 40 shown in FIGS. 1 and 2. This extrusion 80 has a parabolic reflecting groove 84 along one side thereof, and a pair of parallel cooling fluid duct grooves 85 along the opposite side thereof. The filament 31 of the heat source 30 is mounted to be substantially along the focus line of the parabolic grooved reflecting surface 86 so that all the radiation from the source will be directed outwardly therefrom parallel to the sides 81 of the unit (see FIG. 6). Similarly, the fluid cooling ducts 90 may be made of copper tubing and soldered at 91 in the grooves 85, as is the copper tube 50 soldered at 51 in the groove 45 of FIGS. 1 and 2. Between the grooves 85 in the opposite ends and/or in the upper surface of the extrusion 80, there may be provided tapped holes 92 and/or 93, respectively, which may be used for either supporting or mounting the unit against a common plate or on a bar as shown in FIGS. 1 and 2, and/or for mounting terminal blocks 96 of electrical non-conductive material, to which the pig-tails 35 may be attached by means of screws 97 tapped therein and joined by means of a conductive plate 98 to power line connecting screw 99.

Opposite ends of the extrusions 80, which are of shorter length than the tubular envelope 30, may have mounted thereon U-shaped plates 100 (see FIG. 3) attached by screws 101 screwed into holes 92, which U-shaped channels 100 may be lined with a heat insulation material, such as an L-shaped sheet of asbestos 102 as shown in FIG. 3. The outer ends of the channels 100 may have anchored thereto a covered plate 105 which may extend over the whole rear or top of the unit, the end flanges of which are parallel with the outer flanges of the channel 100 and anchored thereto, such as by means of screws 106, thus making a completely enclosed unit.

Figure 5:
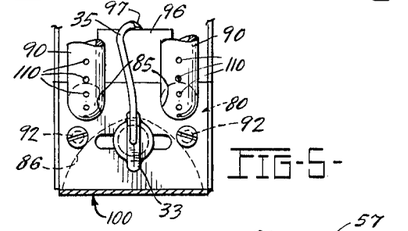
FIG. 5 is a sectional view taken along line V—V at one end of the unit of FIG. 3 showing the pig-tail terminal end of the heat source and the ends of the two cooling ducts.
Figure 6:
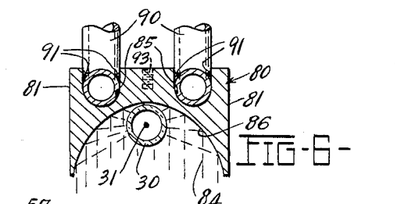
FIG. 6 is a vertical sectional view taken along line VI—VI of FIG. 3 showing the parabolic type reflector employed in the extrusion for the two cooling ducts of the embodiment of this unit.

If a gas such as air, instead of a liquid, is circulated through the cooling ducts 90, the ends of the ducts adjacents the terminals 33 may be provided with apertures 110 as shown in FIGS. 3 and 5, through which this gas may blow to further cool the terminal ends 33 of the heat sources 30, which ends are not in the heat sink extruded bar 80. This air also protects the wire pig-tails 35 from melting. If liquid coolants are used in the tubes 90, no holes 110 are employed, and air from another source may be circulated inside the channels 100 and under the cover 105, for additional cooling of the unit and its terminals, if desired, particularly when a bank of the units are connected together as will be described later in connection with furnaces employing pluralities of similar type units.

Figure 7:
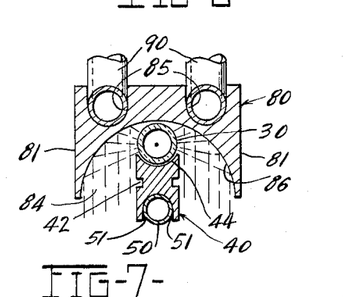
FIG. 7 is a view similar to that shown in FIG. 6 plus a heat sink cooling element as shown in FIGS. 1 and 2 adjacent the opposite side of the heating source from that of the parabolic reflector sink, thereby employing an additional cooling duct for the heating source, and causing all of the rays from the heat source to the object to be heated to be reflected rays.

Furthermore if desired, the extrusion of the type 80 may be employed in combination with the extrusion type 40 as shown in FIG. 7, wherein cooling ducts are embedded in heat sinks which substantially surround opposite sides of the infra-red source envelope tube 30 to insure its further cooling. However, it is understood that the inclusion of the additional heat sink 40 and its reflecting cylindrical surface 44 cuts out direct radiation from the heat source 30 upon the object which is placed in line with the parallel rays from the parabolic reflecting surface 86 of the extrusion 80.

Figure 9:
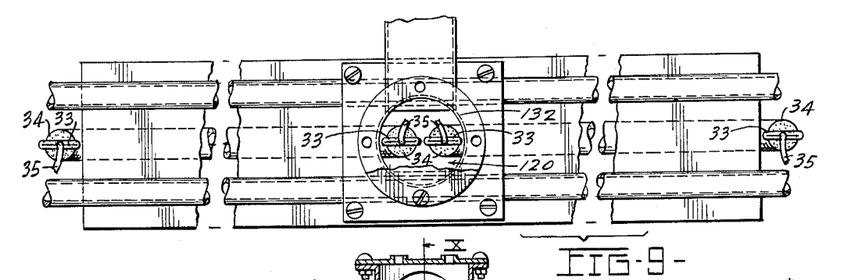
FIG. 9 is a plan view of the unit shown in FIG. 8.
Figure 10:
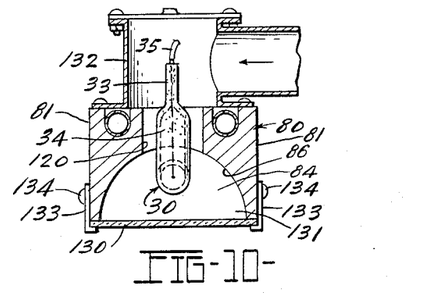
FIG. 10 is a vertical section taken along line X—X of FIG. 8 through said aperture in said heat sink for the bent terminal ends of the heat source.

The heat sink extrusion 80 also may be adapted for use with the bent ended 34 infra-red heat source envelope tubes 30, which ends 34 may project up through an aperture 120 provided in said extrusion as shown in FIGS. 8, 9 and 10. Also, the open side of the parabolic reflecting groove 84 may be covered by a transparent plate or quartz window 130 as shown in FIGS. 8 and 10, so that a cooling gas or air may be forced through the parabolic reflector duct 131 for further cooling along the envelope 30 of the infra-red source during its operation. The aperture 120 in the center is sufficiently large to permit air to flow around the bent terminal ends 34 of the tube 30 into the center of the channel duct 131 and out each open end thereof, so that the incoming cool air which may enter the central duct 131 through the housing 132 which covers the aperture 120. This housing 132 also houses both of the terminal ends 33 of the heat source to keep them cool. If desired, the flow of air or gas through the channel duct 131 may be reversed from that shown and just described, however, if the air is first blown or sucked along the heat sources 30 before being passed over the terminals 33 in the housing 132, the air may become too warm for properly protecting these terminals. The glass window or quartz plate 130 may be held in position over the end of the parabolic reflector channel 131 by means of angle grips 133 as shown in FIG. 10, which may be screwed by screws 134 into the parallel sides 81 of the extrusion 80. This plate 130 may be bowed or other than flat as shown, and may even completely surround the heating element 30 or a plurality of such elements, and thereby form its own duct for a cooling gas to be passed around and along the heating element or elements.

I–B–3 *Multi-source cylindrical reflectors (FIG. 11)*

Figures 11, 16:
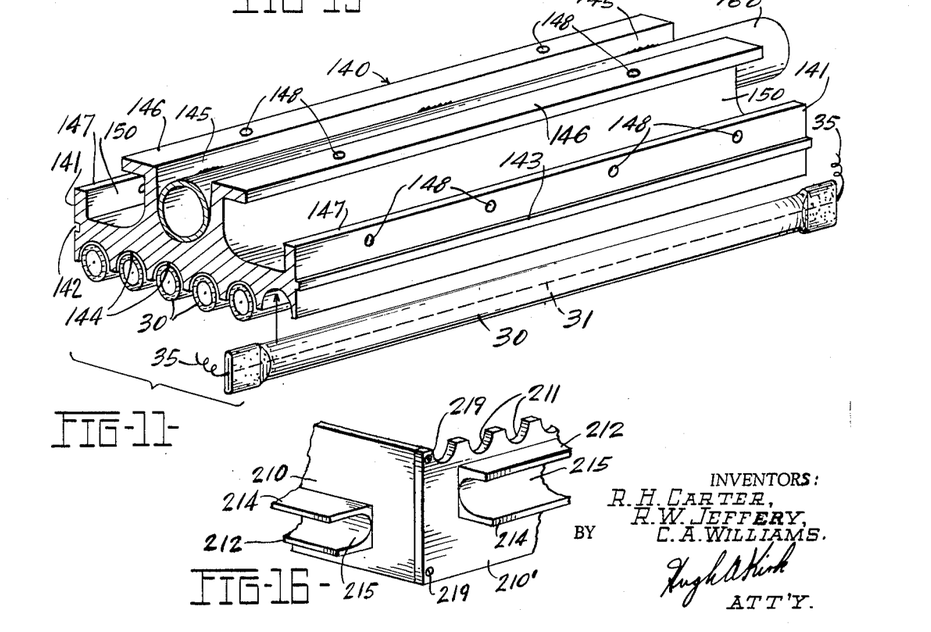
FIG. 11 is a cross sectional and perspective view of another type of heating unit comprising six separated cylindrical reflectors for installation of one to six tubular infra-red heating sources and a single large heat groove for cooling fluid duct and adjacent unit mounting flanges; a pig-tail terminal ended tubular infra-red source being shown out of position from one of the reflectors in this unit.
FIG. 16 is an enlarged perspective view of the corner of the extrusions employed around the sides of the furnace shown in FIGS. 13, 14, and 15, which side extrusions act as heat sinks for protection of the electrical terminals at the ends of the tubular sources as shown in FIG. 14.
Figure 12:
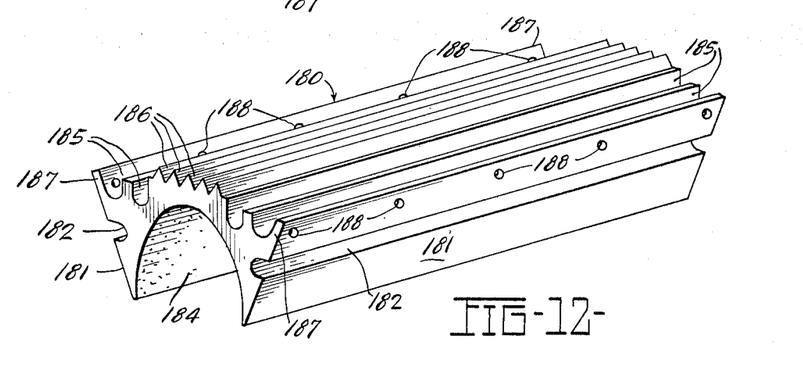
FIG. 12 is still another embodiment of a heat sink extrusion unit for a cylindrical furnace having an elliptical reflector for single tubular heat source and a plurality of channels or grooves for fluid cooling ducts and fins as well as side flanges for mounting adjacent units together in a cylinder as shown in FIG. 25.

Another form of extrusion of high heat conducting metal which may be employed for making a multi-heat source unit, is shown in FIG. 11, and comprises an extrusion 140, which extrusion provides six cylindrical grooves 144 along one side thereof and a single fluid cooling duct groove 145 along the opposite side thereof which cooling duct groove is of greater diameter than that of the grooves 144 and is provided with outwardly extending flanges 146. Additional side flanges 147 also may be provided, both of which flanges 146 and 147 may contain apertures 148 for mounting purposes. The parallel edges or sides 141 of this extrusion may be respectively grooved and notched as desired at 143 and 142, which aid in alignment of fastening adjacent units 140 together. Between the flanges 146 and 147 there is provided spaces or channels 150 through which air or other gas may be circulated for further cooling the units as will be described later.

In the groove 145 there may be soldered or otherwise placed in intimate heat conductive contact, a cooling duct 160 which also may be a copper tube. The cylindrical reflecting surfaces of the grooves 144 may be gold plated or coated with another high infra-red reflecting material, which also may be non-corrosive. These grooves 144 should be sufficiently deep so as to eliminate substantially all direct side radiation from one of the heating elements 31 to that of another adjacent element, as described above for the sides 41 of the grooves 44 of the units 40 in FIG. 2. Thus there is a heat sink acting material separating each of the infra-red radiation sources enabling the conduction away of more non-reflected heat from these sources by the mass of the heat sink extrusion 140 cooled by the cooling duct 160.

I-B-4 *A single source elliptical reflector (FIG. 12)*

Referring now to still another type of extrusion 180 in FIG. 12, its sides 181 converge as the sides of a sector of a circle, the angle of conversion herein shown being such that exactly nine of said extrusions fit adjacent each other to form a circle as shown in FIG. 25. These extrusions 180 have an elliptical reflecting groove 184 along their narrower or inner sides along the focus of which is located the tubular infra-red source element 31. On the wider, opposite or outer side of the segment 180, there may be provided two pairs of grooves 185 for fluid cooling ducts 190. In the sides 181 there may be provided grooves 182 into which additional cooling ducts 191 may be inserted. In addition to these cooling ducts 190 and 191, there also may be provided heat radiating fins 186 intermediate the two pairs of grooves 185, and the sides 181 may extend into flanges 187 having apertures 188 by which they may be connected together into a cylinder by means of bolts 189 as shown in FIG. 25. The opposite focus of each of these elliptical reflecting grooves 184 lie along a common center line 193 which is the center of the cylindrical furnace shown in FIG. 25, as will be referred to again later.

II FURNACES

The different units described in Section I above may be combined side-by-side to form a flat high-heat radiating surface such as the wall of a furnace, or two opposite walls thereof, or on all four or the surrounding or circular walls of a chamber, some specific examples of which will be now described below.

II-A *Flat furnace (FIGS. 13–17)*

Figure 13:
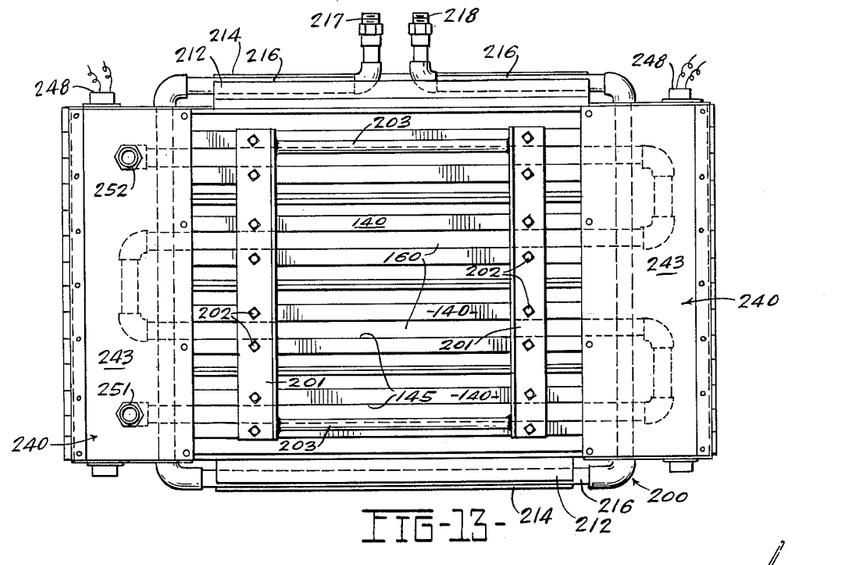
FIG. 13 is a plan view of a flat furnace embodying four adjacent units of the type shown in FIG. 11 showing the connections of the fluid cooling ducts therefor.
Figures 14, 17:
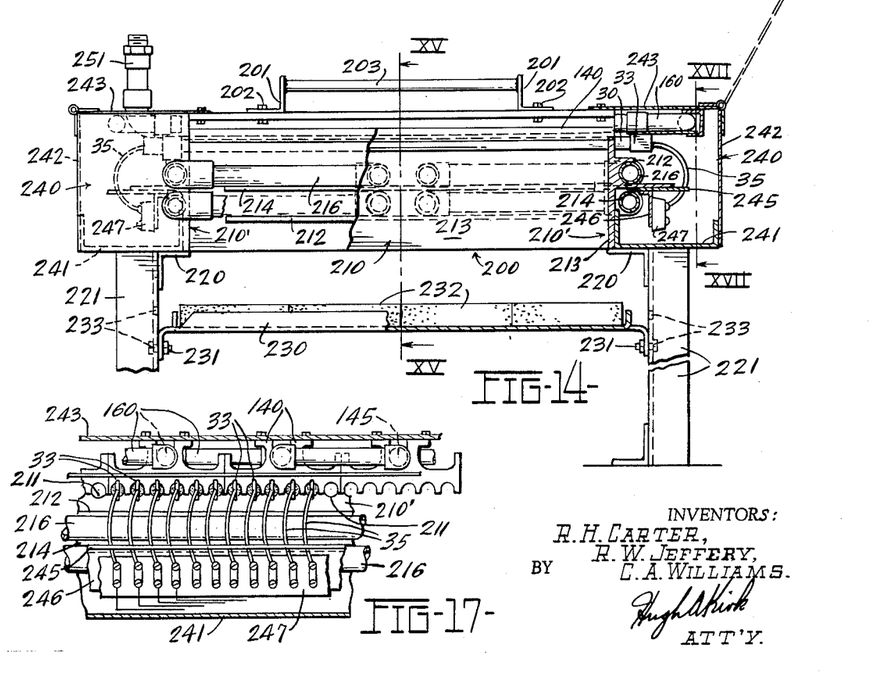
FIG. 14 is a side elevation partly in section of the furnace shown in FIG. 13, showing the means for mounting the pig-tailed terminals of the tubular heating sources.
FIG. 17 is an enlarged partial sectional view taken along line XVII—XVII of FIG. 14 showing a terminal block for the pig-tail terminals for the ends of the tubular infra-red sources on one side of the furnace in FIG. 14.
Figure 15:
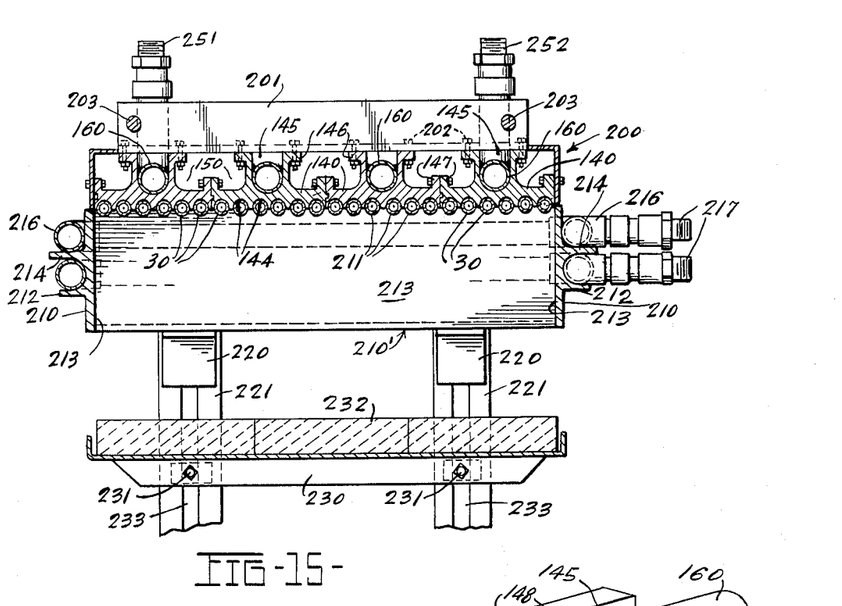
FIG. 15 is a vertical section taken along line XV—XV of the furnace of FIG. 14.

One example of a simple combination of four units of the type 140 shown in FIG. 11 is shown in FIGS. 13 through 15, which are fastened together by a pair of angle brackets 201 to form a furnace 200. These brackets may be attached to the extrusions or heat sink units 140 through the apertures 148 by means of bolts 202, and connected near their ends by cross bars 203 for the purposes of lifting the four units, which form the top of the furnace 200, from their position of rest on its peripheral edges on extruded heat sink type side members 210 and 210'.

These side members or heat sink extrusions 210 and 210', more clearly shown in FIG. 16, may have one opposite pair 210' thereof inverted and notched at 211 along their upper edges to provide space and apertures for the ends of the heat source tubes 30 so that the ends of the units 140 rest on the portion between the notches 211. These side extrusions 210 are herein shown to be provided with flat, preferably gold plated infra-red radiating inner surfaces 213, and on their other or rear sides with flanges 212 and 214 providing an off center groove 215 between which may be mounted and soldered a fluid cooling duct, such as of copper tubing 216, which may completely surround the furnace twice, once for each opposite pair of side members 210 and 210', which tubes may have parallel inlets and outlets 217 and 218, respectively, as shown in FIGS. 13 and 15. These extruded side members 210 may be fastened together at their corners by screws 219 and may rest on angle brackets 220 supported by corner legs 221.

Spaced below the brackets 220 on legs 221 may be mounted a platform 230 by means of bolts 231, which platform 230 may be provided with a heat refractory material surface 232 upon which the objects to be heated are placed and against which the radiation from the bank of heat source elements 30 in bank of units 140 is directed. The distance of the platform 230 from the open lower end of the bank of units 140 may be varied by adjusting the bolts 231 in the holes or slots 233 provided in the legs 221.

The opposite ends of the units 140 may be enclosed in compartments 240 (see FIGS. 13 and 14) comprising lower channel sections 241, sides 242, and hinged lids 243, whereby access may be had to the pig-tail terminals 35 of the heat sources. Inside the boxes 240 there may be mounted on the flanges 214 of extrusion 210, an insulating plate 245 below which may be mounted on another bracket 246 for a terminal block 247 to which the pigtails 35 are attached. This insulating block 247 may be similar to the block 96 shown in FIG. 3 and is shown in more detail in FIG. 17. Electric power sources may enter these boxes 240 through the apertures 248 at the ends thereof shown in FIG. 13. The heavy copper extrusions 210' also act as heat sinks for conducting and reflecting heat away from the terminal boxes 240. Thus, the top of the furnace 200 comprising only the heat sink extrusions 140 may be easily removed and lifted from the heat sources 30, and the lids 243 may be raised so that these infra-red heat sources may be replaced easily without disassembling the furnace 200.

The cooling ducts 160 in the grooves 145 of each of the extrusions 140 may be connected together in series by U-shaped connections at their adjacent ends to form a continuous series circuit for a cooling fluid from inlet 251 to an outlet 252 which extend through the top of one of the boxes 240 as shown in FIGS. 13, 14 and 15. Thus by connecting and flowing a cooling fluid to the inlets 217 and 251, or together in series, any heat which is absorbed in the heat sink extrusions 140, 210 and 210' is conveyed away to prevent too much heating of the electrical terminal boxes and the outside of the furnace 200. In fact in actual practice when this furnace is in continuous operation at full energy input, a person's hands can be laid on the top thereof without burning them.

II-B *Rectangular furnace (FIGS. 18 and 19)*

Two banks of units of the type shown in FIG. 11, in which ten such units are employed in the ceiling and ten in the floor of a furnace 260 is disclosed in FIGS. 18 and 19, which upper and lower banks 261 and 262, respectively, include the two opposite end or side extrusions 210' with notches 211 similar to those disclosed in FIG. 14. The other two sides or opposite ends of this furnace 260 are open whereby a conveyor or platform 265 may be slid in between the two units along the angle rails 266 shown in FIG. 18, for supporting the object or objects to be heated. Since this furnace 260 has both upper and lower radiating surfaces 261 and 262, the platform 265 is perforated and preferably also cooled, such as by cooling fluid ducts or coils 267 therein, to prevent it from deteriorating during heating while suspending the objects 268 thereon, as shown in dotted lines in FIG. 18. In fact, this platform 265 may be provided as a conveyor which may continuously move articles through the furnace 260.

The heating unit banks 261 and 262 as well as the angle brackets 266 for guiding the conveyor or platform 265 may be supported on corner posts 271 which may be provided with cross members 272 and 273 to which the upper and lower units 261 and 262 are respectively anchored, such as by means of adjustable bolts 274 and 275, respectively, so that the distances between the radiating surfaces of elements and the conveyor 265 may be regulated as desired. At the opposite sides of the furnace 260, that is at the ends of the units 140, there may be provided boxes 280 which correspond to the boxes 240 in FIGS. 13 and 14, into which the terminal blocks 247 are mounted for the pig-tails 35 of the infra-red radiation sources 30.

If desired, the tops and bottoms of the banks of units 261 and 262 respectively, may be enclosed by plates 281 and 282 to provide air chambers so that air or other gas which may be circulated from fans 285 and 286, respectively, into inlet ducts 287 and 288 on each side of the furnace to cool electric terminal ends in boxes 280 as well as the backs of the banks of units 140, which already are cooled by the fluid cooling ducts 160 and 216, and out through the open ends of the furnace or if desired, through outlets 289 and 290 in the top and bottom center of furnace 260.

II–C *Polygonal furnace (FIGS. 20 through 22)*

Referring now to FIG. 20 there is shown a cross-section of an octagonal shaped furnace 300 in which each side is composed of two of the units shown in FIG. 11, which pairs of units are housed inside the octagonal walled chamber 301 which also supports the units spaced by means of blocks 302 from the inside of the walls 301, as shown in detail in FIGS. 21 and 22. Thus cooling air may be sucked in along the grooves 150 in the units 140 and behind the units 140 between the blocks 302 by fans 305 connected to the outlet ducts 306 symmetrically located around the furnace 300.

Instead of sucking the air as shown in FIG. 20 through the ducts 306, fans 308 as shown in FIG. 21 may be connected to blow the air into these units through the ducts 306. If a cooling gas is blown into the device, it may be blown directly into the furnace to provide an atmosphere therein around the object being heated, by providing spaces between the adjacent or pairs of units 140, and/or by providing or drilling small holes or apertures 309 (see FIG. 22) in the extrusions 140 from grooves or channels 150 into the bottom of the reflector grooves 144. Then the cooling air or gas may also cool the tubular envelopes 30 of the radiating element as well as also changing the atmosphere inside the furnace, removing or blowing out the open end or ends of the furnace 300 any fumes which may be liberated by the heating of the product in the furnace.

This furnace 300, if desired, may be vertical or horizontal and the object to be heated is suspended along its center line 310 so as to be radiated substantially equally from the pairs of units 140 at each of eight different angles.

II–D *Cylindrical furnaces (FIGS. 23, 24 and 25)*

A housing for a cylindrical furnace 340 is shown in FIGS. 23 and 24 wherein the radiating units are housed in separate upper and lower pairs of hinged quadrant boxes 341 and 342 which may contain louvers 343 in their sides for ventilation purposes and/or inlet and outlet ducts 344 and 345, respectively, connected to fans for further circulating cooling air around the furnace 340. The hinges 346 between the sections 341 and 342 provide easy access to the furnace for replacing heat sources 30, and the like.

Another feature of this particular type of circular furnace 340 is that the object to be heated may be separated from the radiating heat sources by a transparent quartz cylinder 350 spaced from the heating sources and around the outside of which cylinder 350, air may be circulated to keep the cylinder from becoming too hot and deforming. This air for circulating around the cylinder 350 may be air which escapes through spaces left between adjacent units 40 (like those in FIGS. 1 and 2) as shown in FIG. 24, which heating units 40 are radially arranged in four quadrant sections with their cooling ducts 50 connected in series in each quadrant section. Thus the objects to be heated are placed through an open end to the inside of a long quartz tube 350, as in a laboratory type muffle furnace, and there may be quickly heated by radiation from all sides as in an ideal furnace or in a black body.

The end plates 352 of each quadrant section 341 and 342, to which the ends of the units 40 may be attached by the screws 55, may be similar to plates 56 shown in FIGS. 1 and 2, but they also may be provided with quartz cylinder supporting projections 353 as shown in FIG. 24 to locate the quartz cylinder 350 centrally of the heating elements 30.

The pig-tails 35 of the heating units 30 may extend over an insulated plate 355 substantially diagonal of each of the quadrants, and parallel to terminal blocks 356.

Another type of circular furnace 380, already mentioned previously, is shown in FIG. 25, in which the special type of elliptical reflectors 184 along extrusions 180 are ararnged so that all their foci opposite that of the heating elements 31 coincide along the center line 193 of this cylindrical furnace 380. The outside of this furnace 380 may contain a housing 381 within which air or other gas may be circulated by means of one or more fans 382 for further cooling, with the ducts 190 and 191, the backs of the heat sink extrusions 180 for which the fins 186 have been provided.

II–E *Furnace controls (FIG. 26)*

Referring now to the schematic wiring diagram of FIG. 26 there is shown a group of tubular heating sources 30, the opposite terminal ends 33 of which are provided with pig-tails 35 which are connected to terminal blocks 247. Various circuit arrangements can be connected to these blocks 247 so that all, every second, every third, every fourth, every fifth or every sixth one of the heating sources may be energized, simultaneously. These alternate connections may also be energized in any one or more combinations, so as to have a large number of different variations for the very accurate control of the temperature of any object to be heated by this bank of infra-red heating sources. Furthermore, these connections may be made through variable transformers, saturable reactors, silicon controlled rectifiers, thyratron or ignitron tubes, or other conventional means for controlling the voltage, which means may be manually or automatically modulated by means of a remote detector such as a thermocouple, thermistor, radiometer or other conventional means. This voltage is proportional to the amount of heat given off by the filament 31 inside each one of the heating sources 30. Thus by connecting to an electrical control panel the leads shown to the left side of FIG. 25, combinations can be obtained whereby the upper or lower end of the temperature scale may be varied by an infinite number of combinations.

Thus the adaptability and versatility of a furnace comprising the separate units of the types disclosed in this invention is substantially infinite, and therefore is readily adaptable to any particular type of job, whether the object to be heated is on a fast moving conveyor or web, or whether it is an object to be retained at a certain temperature, or exposed to quick heat cycles, or the like.

While there is described above the principles of this invention in conection with specific apparatus, it is to be clearly understood that this description is made only by way of examples and not as a limitation to the scope of this invention.

What is claimed is:
1. An electric infra-red heater comprising:
   (A) a linear infra-red ray emitter having
      (1) a central ray emitting portion, and
      (2) electrical terminals located at the ends thereof;
   (B) a heat conducting material forming a substantial heat sink extending along said emitting portion of said emitter and including an extending part to substantially shield said terminals from direct and/or indirect rays from said emitting portion, said heat conducting material including
      (1) an infra-red reflecting surface on said shield extending part and along said emitting portion of said emitter, and
      (2) a channel in said material and spaced by said material from said reflecting surface for conduction of a heat dissipating fluid to cool and help preserve said reflecting surface and to cool said material including said shield extending part which shields said terminals.
2. A high power density radiator, comprising a plurality of electric infra-red heater units, each unit comprising:
   (A) a linear emitter having
      (1) a central ray emitting portion, and

(2) electrical terminals located at the ends thereof;

(B) heat sink means having appreciable heat sink properties extending along and at least partly around said emitting portion and including an extending part to substantially shield said terminals from direct and/or indirect rays from said emitting portion, said heat sink means including:
   (1) an infra-red reflecting surface on said shield extending part and along said emitting portion, and
   (2) a channel in said heat sink means spaced from said reflecting surface for conduction of a heat dissipating fluid to cool said reflecting surface and to cool said heat sink means including said shield extending part which shields said terminals; and (C) means for connecting a plurality of said units together with their emitters parallel to each other and their heat sink means adjacent each other.

3. A radiator according to claim 2 wherein said shield extending part which shields said terminals comprises a separate member near the ends of the part of said heat sink means extending along said emitting portion of said emitter.

4. A radiator according to claim 3 wherein said shield extending part is common for a plurality of said heater units.

5. A radiator according to claim 3 wherein said shield extending part has its own channel for conduction of a heat dissipating fluid to cool said shield extending part.

6. A radiator according to claim 5 wherein said channel in said shield extending part contains a metal tube in intimate contact therewith.

7. A radiator according to claim 2 including means for at least partly enclosing adjacent terminals of said units for circulating a cooling gas around said terminals.

8. A heater according to claim 1 wherein said heat conducting material comprises a metal extrusion.

9. A heater according to claim 8 wherein said metal is copper.

10. A heater according to claim 8 wherein said metal is aluminum.

11. A heater according to claim 1 wherein said reflecting surface is gold plated.

12. A heater according to claim 1 wherein said reflecting surface comprises a processed silica-aluminum sandwich to resist oxidation.

13. A heater according to claim 1 wherein said reflecting surface along said emitting portion of said emitter is a semi-cylindrical groove in said material.

14. A heater according to claim 1 wherein said reflecting surface along said emitting portion of said emitter is a parabolic groove in said material.

15. A heater according to claim 1 wherein said reflecting surface along said emitting portion of said emitter is a semi-elliptical groove in said material.

16. A heater according to claim 1 wherein said heat dissipating fluid comprises water.

17. A heater according to claim 1 wherein said channel in said heat conducting material contains a metal tube in intimate contact therewith.

18. A heater according to claim 1 wherein said heat conducting material comprises a plurality of said channels opposite its infra-red ray reflecting surface for said heat dissipating fluid.

19. A heater according to claim 1 wherein said reflecting surface along said emitting portion of said emitter comprises a plurality of grooves for a corresponding plurality of said emitters separated from each other by the sides of said grooves so that one emitter will not emit rays directly onto an adjacent emitter.

20. A heater according to claim 1 wherein said heat conducting material is divided into two parts, one on each side of said emitter, and said heat dissipating fluid channel is associated in contact with each of said parts.

21. A heater according to claim 1 wherein said heat conducting material comprises at least one transverse aperture therein extending from its said reflecting surface to the opposite side of said material for permitting a cooling fluid to be passed adjacent said emitter.

22. A heater according to claim 1 including a window spaced from said emitter and closing said reflecting surface for the passage of a cooling fluid between said surface and said window around said emitter for further cooling said emitter.

23. A heater according to claim 1 wherein said emitter has a tubular envelope.

24. A heater according to claim 23 wherein said envelope of said emitter is gold plated near its ends to reduce the radiation on its electrical terminal ends.

25. A heater according to claim 17 wherein said metal tube has holes adjacent said terminals for blowing a cooling fluid over said terminals.

26. A radiator according to claim 6 wherein said channel in said separate shield extending part includes flanges for at least partly surrounding its said tube.

27. A radiator according to claim 3 wherein said separate shield extending part comprises a metal extrusion.

28. A radiator according to claim 2 including means for circulating a cooling gas around said heat sink means adjacent said heat dissipating fluid channels.

29. A radiator according to claim 2 including apertures through said plurality of heat sink means of said heater units, and means for causing a gas to flow through said apertures and directly over said emitters for their further cooling.

30. A furnace having a radiator according to claim 2 including apertures through said plurality of heat sink means of said heater units, and means for causing a gas to flow through said apertures for maintaining a predetermined atmosphere in said furnace.

31. A furnace comprising a plurality of radiators according to claim 2 including banks of said units on opposite walls of said furnace, and means for supporting objects to be heated between said opposite walls.

32. A furnace according to claim 31 including means for cooling said object supporting means.

33. A furnace comprising a radiator according to claim 2 wherein said units are arranged symmetrically around a central longitudinal axis.

34. A furnace comprising a radiator according to claim 2 wherein said heat sink means have identical sector shaped cross-sections for forming the walls of a cylindrical furnace.

35. A radiator according to claim 2 wherein said means for connecting said heat sink means together comprises flanges along adjacent edges of said heat sink means.

36. A radiator according to claim 2 wherein said emitters are separately mounted from said heat sink means and their heat dissipating channels, whereby said emitters may be readily removed for replacement.

37. A radiator according to claim 2 wherein said emitters have tubular envelopes.

38. A radiator according to claim 2 including terminal blocks behind said shield extending part for separate releasable attachment of said each of said electrical terminals of said emitters.

39. A radiator according to claim 2 including means for connecting alternate groups of one or more of said emitters in a bank to separate power source conductors for varying the heat emitted by said bank.

40. A furnace comprising a plurality of radiators according to claim 2 including a hollow quartz tube in which an object to be heated is placed, means for removably arranging arcuate banks of said heating units symmetrically around said quartz tube, and means for circulating a cooling gas between said units and said quartz tube.

References Cited by the Examiner

UNITED STATES PATENTS

| | | | |
|---|---|---|---|
| 2,139,201 | 12/1938 | Nordstrom | 13—25 |
| 2,158,886 | 5/1939 | Peterman | 240—47 |
| 2,253,981 | 8/1941 | Peyches | 13—25 |
| 2,627,014 | 1/1953 | Kolb | 219—349 |
| 2,710,336 | 6/1955 | Jorn | 240—9 |
| 2,788,958 | 4/1957 | Tilden | 263—8 |
| 2,822,458 | 2/1958 | Hatch | 219—400 |
| 2,860,225 | 11/1958 | Steen | 219—407 X |
| 2,981,819 | 4/1961 | Gregory | 219—405 |
| 3,005,081 | 10/1961 | Kordes et al. | 219—343 X |
| 3,015,711 | 1/1962 | Bridwell | 219—343 |
| 3,038,987 | 6/1962 | Dow et al. | 219—343 |
| 3,059,086 | 10/1962 | Pedersen | 219—343 |
| 3,114,822 | 12/1963 | Boland | 219—343 X |
| 3,157,775 | 11/1964 | Harmon | 219—347 |

FOREIGN PATENTS 264,814 12/1927 Great Britain.

RICHARD M. WOOD, *Primary Examiner.*